IMPULSE GENERATING APPARATUS

Filed May 19, 1950 3 Sheets-Sheet 1

INVENTORS.
Bernard M. Gordon
Herman Lukoff
George V. Eltgroth
Attorney

May 31, 1955 B. M. GORDON ET AL 2,709,747

IMPULSE GENERATING APPARATUS

Filed May 19, 1950 3 Sheets-Sheet 2

INVENTORS.
Bernard M. Gordon
Herman Lukoff
George V. [illegible]
Attorney

May 31, 1955 B. M. GORDON ET AL 2,709,747

IMPULSE GENERATING APPARATUS

Filed May 19, 1950 3 Sheets-Sheet 3

INVENTORS.
Bernard M. Gordon
Herman Lukoff
George V. Eltgroth
Attorney

United States Patent Office 2,709,747
Patented May 31, 1955

2,709,747

IMPULSE GENERATING APPARATUS

Bernard M. Gordon and Herman Lukoff, Philadelphia, Pa., assignors, by mesne assignments, to Remington Rand Inc., New York, N. Y., a corporation of Delaware Application May 19, 1950, Serial No. 162,891
15 Claims. (Cl. 250—27)

This invention relates to an impulse generating circuit. and, more particularly, to a one-pulse generating circuit One-pulse multivibrator or generator circuits, utilizing resistance and capacitance to achieve delaying action, have heretofore had their delay period limited by the grid-biasing effect resulting when the delay resistance is increased and by the necessity of enlarging the physical dimensions of capacitors to obtain higher delay capicitance, the delay period obtained being directly related to the product of resistance and capacitance (RC); familiarly known as the circuit time constant. Another disadvantage of one-pulse multivibrators or generators known heretofore, is the inability to trigger such a multivibrator for generating another impulse immediately after its return to its original state, because of the requirement for recharging the delay capacitors.

Accordingly, it is an object of the invention to provide a new and improved one-pulse generator circuit utilizing resistors and capacitors in a manner achieving delay periods exceeding those heretofore obtainable.

Another object of the invention is to provide a new and improved one-pulse generator circuit having a time constant with a high resistance to capacitance ratio achieving delay periods exceeding those heretofore obtainable.

Still another object of the invention is to provide a new and improved one-pulse generator circuit producing substantially square impulses of long duration.

Yet another object of the invention is to provide a new and improved one-pulse generator circuit producing impulses of given duration with low marginal error.

A further object of the invention is to provide a new and improved one-pulse generator circuit which, when actuated by a triggering signal, produces one impulse regardless of the number of succeeding triggering signals received during the generation of said impulse.

Still a further object of the invention is to provide a new and improved one-pulse generator capable of being triggered almost immediately after generating an impulse of given duration.

Yet a further object of this invention is to provide a new and improved one-pulse generator fully responsive to triggering impulses of small amplitude and/or duration while using a minimum number of components.

Another object of the invention is to provide an efficient and reliable one-pulse generator satisfying all of the above objectives.

Figure 1:
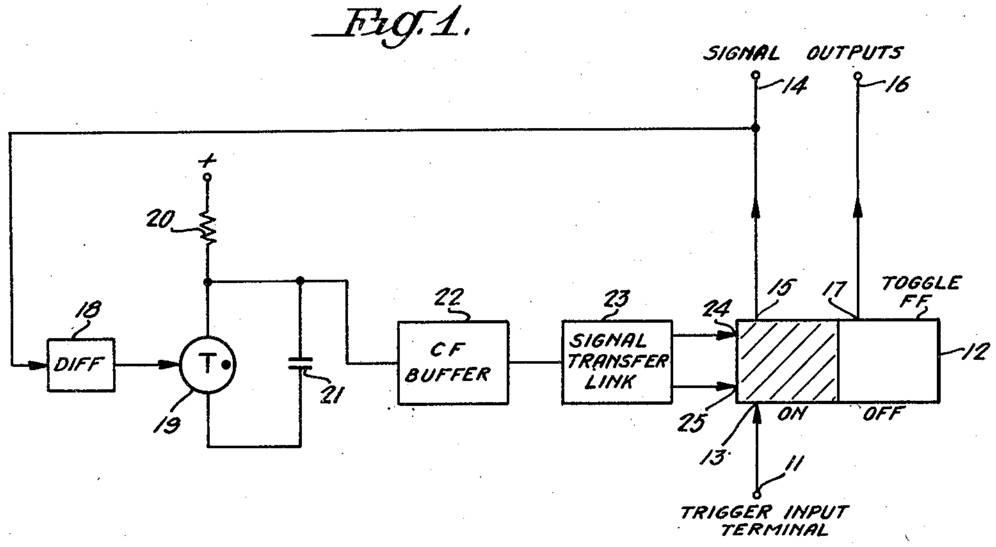
Figure 2:
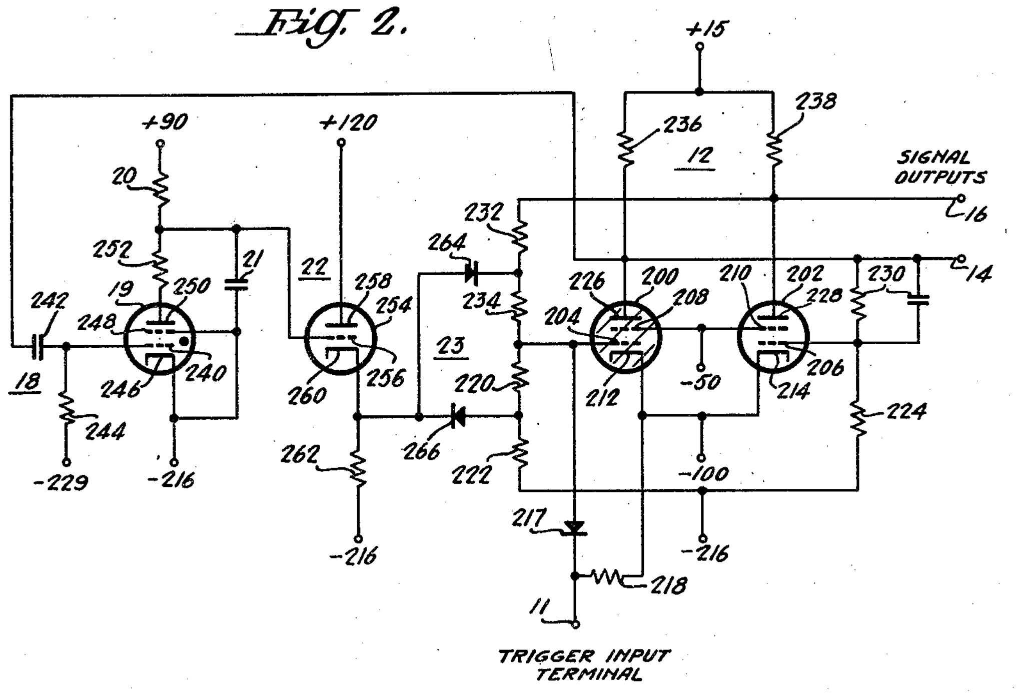
Figures 3, 4, 5, 6, 7, 8:
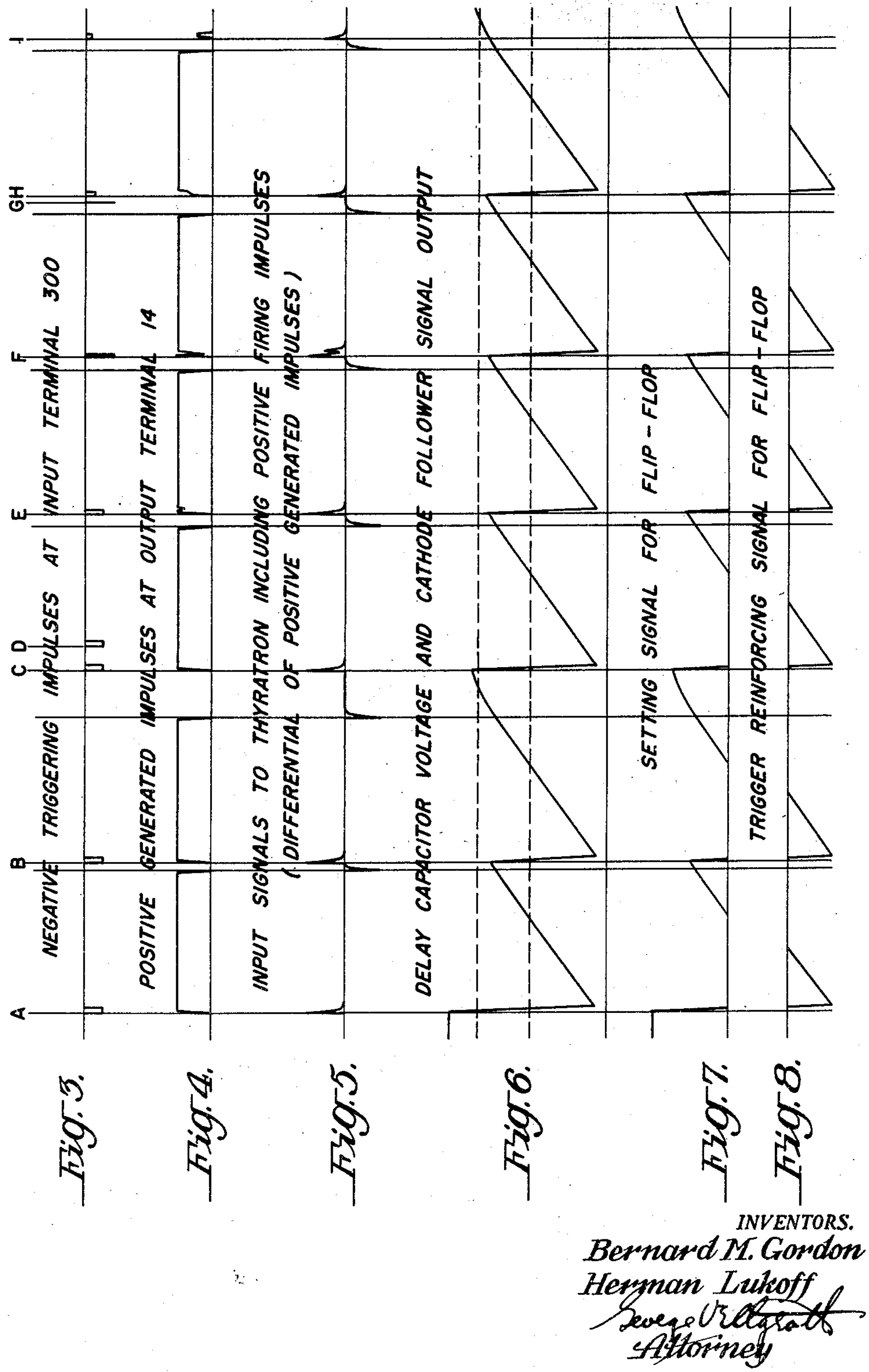
Figure 9:
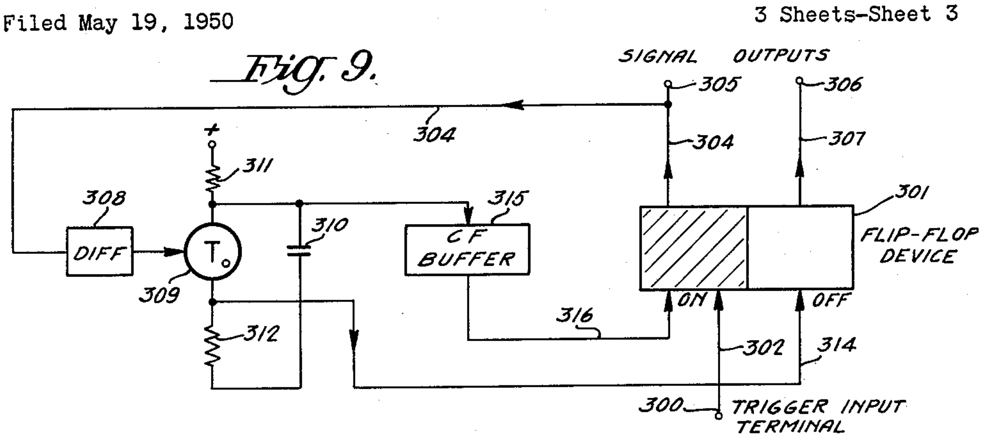
Figure 10:
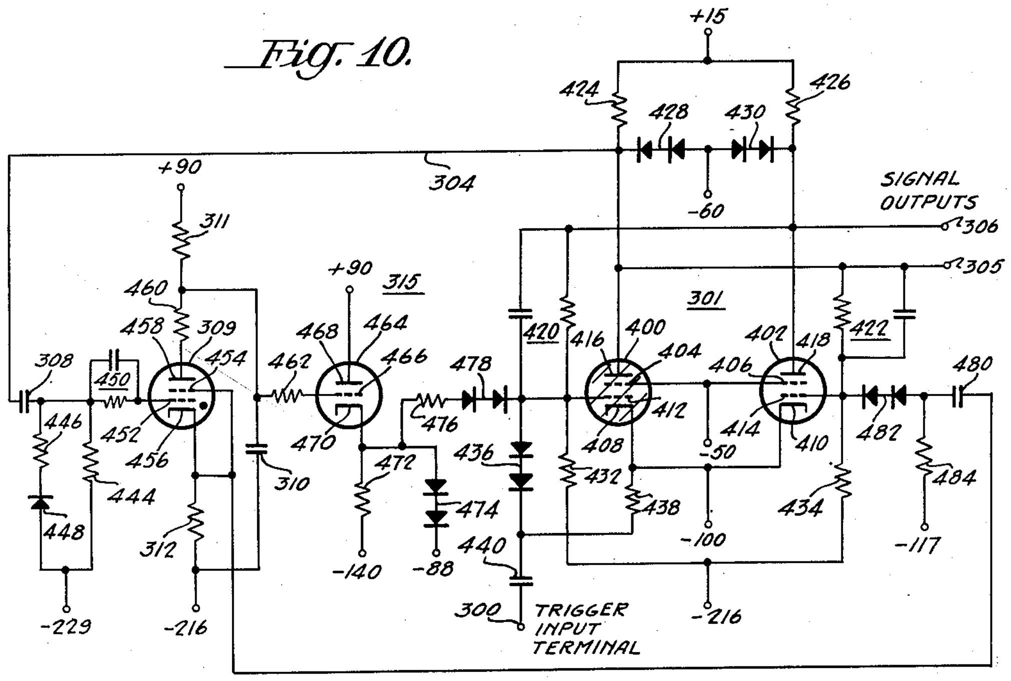

The foregoing and other objects of the invention will become more apparent as the following detailed description of the invention is read in conjunction with the drawings in which:

Figure 1 illustrates in block form a one-pulse generating circuit utilizing a toggle flip-flop embodying the invention, Figure 2 illustrates schematically the one-pulse generating circuit shown in Figure 1, Figure 3 is a graphic representation of negative triggering impulses appearing upon the trigger input terminal of a one-pulse generating circuit, Figure 4 is a graphic representation of positive-going impulses generated by the novel circuit, Figure 5 is a graphic representation of the signals derived by differentiating the positive impulses of Figure 4, of which the positive impulses are utilized to fire the thyratron circuit employed in the invention, Figure 6 is a graphic representation of the variation of voltage with time appearing across the delay capacitor of the thyratron circuit, Figure 7 indicates graphically the resetting voltage delivered to the toggle flip-flop circuit by the cathode follower, Figure 8 indicates graphically the trigger reinforcing voltage delivered to the toggle flip-flop circuit by the cathode follower circuit, Figure 9 illustrates in block form a one-pulse generating circuit utilizing a conventional flip-flop embodying the invention in a modified form, Figure 10 illustrates schematically the one-pulse generating circuit shown in Figure 9.

Referring now for greater detail to the drawings, which illustrate a particular embodiment of this invention, in which like parts are referred to by like reference characters and values of potential are given for purposes of illustration only and not in order to limit the scope of the invention, Figure 1 illustrates in block form a one-pulse generating circuit having a multistable device, to wit, a toggle flip-flop 12 (shown in its "set" state) comprising a normally "on" or conducting portion having signal input terminals 13, 24, and 25, an output terminal 15, and a normally "off" or nonconducting portion which has an output 17 connected to the signal output terminal 16. These conditions are reversed when the flip-flop 12 is in its "triggered" state. The toggle flip-flop 12 has its input 13 directly linked to the trigger input terminal 11 and its output 15 joined to a signal output terminal 14 and to a thyratron 19 through a differentiator 18.

When a negative triggering pulse appears upon the input terminal 11 and is delivered to the toggle flip-flop 12 at its input 13, conduction is transferred from the normally conductive portion of said toggle flip-flop 12 to the normally "off" portion placing it in the "triggered" state which results in the delivery of a negative-going impulse to the signal output terminal 16 and a positive-going impulse to the signal output terminal 14 and the differentiator 18. A differentiated positive signal is delivered by the differentiator 18 to the thyratron 19.

The thyratron valve 19, which has a delay capacitor 21 connected across it, is connected to a positive potential through a resistor 20 and is linked to a cathode follower buffer 22 driving a signal transfer link 23 which connects to the signal input terminals 24 and 25 of the toggle flip-flop 12.

When a triggering signal appears upon the input terminal 11, resulting in the delivery of a positive differentiated pulse to the thyratron valve 19 from the toggle flip-flop output 15, the normally nonconductive thyratron valve 19 ionizes, quickly discharging the delay capacitor 21 to reduce the voltage input to the cathode follower buffer 22 resulting in the delivery of a negative impulse at the toggle flip-flop terminal 25 through the signal transfer link 23. This negative impulse assures the continuation of the triggered state. When the conduction current through the thyratron valve 19 has become sufficiently small due to the discharge of the delay capacitor 21 to cause deionization, the thyratron valve becomes nonconductive allowing the recharge of the delay capacitor 21 through the resistor 20. Upon the recharging of the delay capacitor 21, the voltage delivered to the cathode follower buffer 22 increases exponentially to a point where a sufficiently positive potential is delivered to the input terminal 24 of the toggle flip-flop 12 to cause the toggle flip-flop to resume its "set" state, with the left-hand side conductive. It may be noted that negative triggering pulses delivered to the toggle flip-flop 12 when it is in its triggered condition do not affect the discharging or charging of the delay capacitor 21. The thyratron circuit being unaffected by such triggering impulses, error is reduced in the duration period of generated impulses. The positive resetting signal delivered to the terminal 24 of the toggle flip-flop 12 assures the resetting of the toggle flip-flop after a given period of time.

Referring now to Figure 2 for a more detailed description, toggle flip-flop 12 comprises flip-flop valves 200 and 202, which have cathodes 212 and 214 respectively returned to a negative potential of 100 volts, screen grids 208 and 210 respectively returned to a negative potential of 50 volts, anodes 226 and 228 respectively connected to signal output terminals 14 and 16 and returned to a positive potential of 15 volts through anode resistors 236 and 238 respectively. The flip-flop valve 202 also has its anode 228 linked to the control electrode 204 of flip-flop valve 200 by means of series resistors 232 and 234, and has its control electrode 206 coupled to the anode 226 of said flip-flop valve 200 through a parallel capacitor-resistor combination 230, said control electrode 206 being returned to a negative potential of 216 volts through a grid resistor 224. The control electrode 204 of flip-flop valve 200 is returned to a negative potential of 216 volts through series grid resistors 220 and 222, is joined to the trigger input terminal 11 through a crystal diode 217, and is linked to the cathode 212 through said crystal diode 217 and a series resistor 218.

A negative triggering impulse at the input terminal 11 is delivered to the control electrode 204 of the normally conducting flip-flop valve 200 and, if sufficiently negative, will extinguish it and result in a positive impulse on the anode 226 which is delivered to the control electrode 206 of the normally nonconductive flip-flop valve 202 through the resistor-capacitor combination 230, transferring conduction thereto. Thus, a positive impulse will appear upon the signal output terminal 14, whereas a similar negative impulse will appear upon the signal output terminal 16. The flip-flop valve 202 remains conductive as long as flip-flop valve 200 remains nonconductive because the smaller voltage drop appearing across anode resistor 236 results in a more positive voltage appearing upon the control electrode 206 of flip-flop valve 202. The combination of crystal diode 217 and resistor 218 prevents the control electrode 204 from becoming positive with respect to the cathode 212 to the extent that a negative triggering pulse will not effect transfer of conduction in said trigger flip-flop circuit 12.

A thyratron valve 19 having its control electrode 240 negatively biased by returning it to a negative potential of 229 volts through a grid resistor 244 is linked to the anode 226 of the flip-flop valve 200 by means of a coupling capacitor 242. The said thyratron valve 19 has its screen electrode 248 and cathode 246 directly returned to a negative potential of 216 volts and its anode 250 returned to a positive potential of 90 volts through a surge limiting resistor 252 and charging resistor 20. The anode 250 is also joined to the cathode 246 by means of the series connection of said surge limiting resistor 252 and a delay capacitor 21 and is coupled to the control grid 256 of a cathode follower valve 254 through said resistor 252.

Prior to the arrival of a positive firing impulse from the anode 226 of the flip-flop valve 200, the thyratron valve 19 is nonconductive, being negatively biased, allowing the delay capacitor 21 to be charged through the resistor 20 to a positive potential substantially equal to 90 volts. The ultimate limit to the time constant attainable in a circuit utilizing the intermittent discharge of a capacitor normally connected to a supply source through a charging resistor as in the circuit including resistor 20 and capacitor 21 is set by the conductance in the discharge circuit existing when the shunt arm is nominally nonconductive. As the delay capacitor must be quickly discharged, it is desirable that the ratio of conductance during the current passing period to the conductance during the period when no current is intended to flow, should be as large as possible. In the "hard" valve circuits which are familiar, this ratio is much less than in an arrangement such as that disclosed incorporating a "gas" valve 19. The improved ratio attendant upon the use of the gas valve 19 correspondingly improves circuit operation. The positive impulse delivered by the toggle flip-flop circuit 12 to the control electrode 240 of the thyratron valve 19 is differentiated by the combination of capacitor and resistor 242 and 244 respectively. This differentiated impulse must be positive and of sufficient amplitude and duration to fire the thyratron valve 19 when the delay capacitor 21 has been sufficiently charged to raise the voltage appearing upon the anode 250 above a given value. This requirement places a lower limit upon the negative triggering impulse which will be effective, keeping in mind that the use of the flip-flop valves 200 and 202 in the dual capacity of triggering impulse amplifier and flip-flop makes possible the utilization of smaller triggering signal without the need of additional components. The existence of a minimum triggering voltage is considered desirable to discriminate against random noise impulses. When the thyratron valve 19 becomes conductive the anode to cathode potential across the thyratron drops to a relatively low value of less than ten volts and the delay capacitor 21 discharges therethrough, the discharge current being limited by the discharge resistor 252 to a value preventing injury to the thyratron valve 19 but still allowing the almost instantaneous discharge of the delay capacitor 21. As the delay capacitor 21 discharges, the current through the thyratron valve 19 is reduced to a point where dionization occurs resulting in its extinguishment. The thyratron valve 19 does not become conductive again until a positive-going firing pulse is applied to its control grid 240 at a time when the anode 250 is sufficiently positive. After discharge the delay capacitor 21 is recharged through the resistor 20, so the voltage appearing across the delay capacitor 21 rises exponentially with time at a rate dependent upon the product of the values of resistance and capacitance of said resistor 20 and delay capacitor 21. Marginal error in the duration period of a generated impulse is reduced in this thyratron delay circuit by the fact that the recharging of the delay capacitor 21 starts from the same reference voltage level each time the thyratron is fired.

The said cathode follower valve 254 which has its control electrode 256 coupled to the anode circuit of thyratron valve 19, has its anode 258 directly linked to a positive potential of 120 volts and its cathode 260 returned to a negative potential of 216 volts through a cathode resistor 262. The said cathode 260 is joined to the anode of a crystal diode 264 and the cathode of a crystal diode 266, the cathode of the crystal diode 264 being connected to the junction point of the resistors 232 and 234 and the anode of crystal diode 266 being joined to the junction point of the grid resistors 220 and 222 of said toggle flip-flop circuit 12.

When the delay capacitor 21 is charged sufficiently, a positive voltage is delivered to the control electrode 256 of the cathode follower valve 254, causing a high anode current flow through the cathode follower valve 254 to produce a large voltage drop across the resistor 262. The potential of the cathode 260 being more positive than the voltage appearing upon the cathode of crystal diode 264 a "resetting" signal is transmitted through said diode 264 and resistor 234 to the control electrode 204, making the flip-flop valve 200 conductive to initiate the "set" state. When the delay capacitor 21 is quickly discharged the voltage appearing upon the control electrode 256 of cathode follower valve 254 is rapidly reduced to decrease the current flow therethrough, resulting in a greatly reduced voltage drop across the cathode resistor 262. The previously conducting crystal diode 264 becomes nonconductive because its anode is at a lower potential than its cathode. However, the crystal diode 266 which was previously nonconductive, because its cathode was at a higher potential than its anode, now becomes conductive, transmitting a negative impulse through the grid resistor 220 to the control electrode 204 resulting in the extinguishment of flip-flop valve 200 or maintaining its extinguishment if the triggering impulse is of sufficient amplitude and duration to initially extinguish the flip-flop valve 200, until the triggering signal appears. It should be noted that the negative impulse derived from the cathode follower is applied to the control grid 204 of the flip-flop valve 200 very shortly after the application of a negative triggering impulse to the control electrode 204. This is evident from the fact that the said negative trigger reinforcing impulse is derived from the cathode follower as a result of the rapid discharge of delay capacitor 21 occasioned by firing of the thyratron valve 19 upon receipt of a positive firing impulse derived from the toggle flip-flop circuit 12 when it is excited by a negative triggering signal from the input terminal 11. The said negative trigger reinforcing impulse delivered to control electrode 204 is essential when the triggering impulse is of extremely short duration (less than ionizing time of thyratron valve 19) even if its amplitude is sufficient to set the flip-flop circuit 12 because the flip-flop circuit 12 tends to return to its original state upon the removal of the triggering impulse due to the positive signal yet derived from the cathode follower circuit. In such case the negative impulse appearing shortly after the removal of the original triggering pulse serves the function of effectively triggering the toggle flip-flop circuit 12.

The resistors 234 and 220 are useful in that they provide a high impedance output for the cathode follower circuit, which is desirable in that the effective cathode resistance of the cathode follower circuit remains practically constant, under varying operating conditions. A high input impedance for the trigger signal is also obtained by means of the said resistors 234 and 220 without which the input impedance would be substantially equal to the lower impedance of the cathode resistor 262 of the cathode follower circuit. In conclusion, once the negative triggering pulse appears upon the trigger input terminal 11, conduction is transferred from the normally conducting flip-flop valve 200 to the normally nonconducting flip-flop valve 202 which transfer is assured by a negative impulse derived from the cathode follower circuit as a result of the triggering impulse. The flip-flop valve 200 remains nonconductive until its control electrode 204 receives a positive impulse from the cathode follower circuit after a given period, determined by the charging of the delay capacitor 21 associated with the resistor 20 and thyratron valve 19. The duration of the generated impulse may be controlled by varying the resistance and capacitance of the resistor 20 and the delay capacitor 21 respectively, their product (RC), the time constant of the thyratron circuit being directly related to said duration. The resistor 20 may have an extremely high resistance for increasing the circuit time constant without resulting in self-biasing or cutoff of the following cathode follower circuit. This is so because in the cathode follower circuit the control electrode 256 is maintained at a voltage above cutoff with respect to the cathode 260 regardless of the resistance of the anode resistor 20 in the thyratron circuit. Further, because the delay resistance 20 is not associated with the flip-flop valve 200 its value does not effect the functioning of the toggle flip-flop circuit 12, which effect is a serious disadvantage in the prior art because of the self-biasing to cutoff of flip-flop valves when the delay resistance is increased beyond a given value and the poor circuit rise time characteristics experienced.

Further clarification of the functioning of the above-described circuit may be obtained by referring to the graphic representations of the voltages appearing at different points in the above-described circuit, shown in Figures 3, 4, 5, 6, 7, and 8. Figure 3 indicates negative triggering impulses of differing amplitudes and durations upon the trigger input terminal 11. Figure 4 shows the positive-going impulses generated which appear upon the signal output terminal 14. Identical negative-going impulses appear simultaneously upon the signal output terminal 16 (not graphically shown). Figure 5 shows the signal impulses derived by differentiating the positive-going impulses shown in Figure 4, the derived positive impulses being those effecting the firing of the thyratron valve 19. Figure 6 is a representation of the voltage variations appearing across the delay capacitor 21 and at the output of the cathode follower circuit. It should be noted that upon the occurrence of a positive firing impulse of sufficient amplitude and duration, the voltage across the delay capacitor 21 rapidly declines to a minimum (approximately 8 volts), whereupon the voltage rises exponentially until the thyratron valve 19 is fired again or the voltage reaches a substantially constant level. Figure 7 indicates the setting voltage delivered through the crystal diode 264 toward the end of the timed interval. The flip-flop trigger signals appearing in Figure 8 are derived from the voltage shown in Figure 6 when said voltage reaches its low values upon the discharge of the thyratron valve 19, which occurs almost immediately after an actuating trigger pulse (see Figure 3). The time elapsing before a trigger reinforcing pulse is produced after a triggering impulse appears is short in relation to duration of a generated impulse and does not produce an appreciable marginal error. The relatively low voltage signal pulses passed by crystal diode 266 shown in Figure 8 are of short duration because when conduction is passed to flip-flop valve 202, the voltage on the anode of the crystal diode 266 becomes less positive, and the voltage on its cathode becomes continually more positive with time, shortly becoming positive with respect to the anode to prevent further conduction. Conduction through the crystal diode 264 will be delayed for a time after diode 266 becomes nonconductive because its cathode is connected to a higher voltage point, being joined to series resistors 232 and 234, as compared to the lower voltage at the junction point of grid resistors 220 and 222 to which diode 266 is joined. When the anode of the crystal diode 264 becomes sufficiently positive, the increasing voltage developed by the cathode follower circuit represented in Figure 6 is delivered through the diode 264 to the control electrode 204 of the nonconducting flip-flop valve 200, which signal is shown by Figure 7. When the said increasing positive signal or setting signal delivered to the control electrode 204 of the flip-flop valve 200 becomes sufficiently positive, the flip-flop valve 200 becomes conductive, and causes the flip-flop valve 202 to become nonconductive terminating the generated impulse. It should be noted that the positive setting voltage is derived from a portion of the voltage curve which rises rapidly, resulting in a generated impulse of accurately determined duration and of minimum marginal error.

Figures 3 and 4 also indicate that only one impulse will be generated after the apparatus is actuated by a triggering signal, regardless of the number of succeeding triggering signals received during the generation of said impulse. Considering Figures 4, 5, and 6, it is apparent that the apparatus is in condition for retriggering almost immediately after the termination of each impulse. Figure 6 shows the charge recovery of the delay capacitor 21 which brings the anode 250 of the thyratron valve 19 to operating potential. Inspection of Figure 5 reveals that negative-going, as well as positive-going impulses are present in the output of the differentiating circuits.

The leading edge of the negative stroke is produced by the return of the flip-flop 12 to the "set" state, preparing the circuit for the receipt of the next triggering impulse. Due to the circuit time constants, however, the trailing edge of this negative-going impulse is somewhat drawn out and may interfere with the response of the circuit to the next arriving trigger impulse. Fortunately, the time period when such interference may occur, is relatively brief, as is evident from Figure 5, and may not be important in many applications.

Referring now to Figures 3, 4, 5, and 6 for a consideration of the operation of the one-pulse generating apparatus when triggering impulses of varying amplitude and duration are applied, it may be noted that when a triggering impulse (A, B, C, in Figure 3) is of sufficient amplitude to directly trigger the flip-flop valve 200 and endures until the arrival of the trigger reinforcing signal, the generated impulse (Figure 4) quickly attains a positive value which is maintained until the occurrence of the resetting signal. If the triggering impulse (E in Figure 3) does not endure until the arrival of the triggering reinforcing signal, the positive generated impulse voltage begins to decrease (flip-flop valve 200 starts conducting) because of the positive signal yet impressed on the control electrode 204 of flip-flop valve 200 by the cathode follower circuit, until it is replaced by the negative trigger reinforcing signal (see Figure 4). If the amplitude and duration of the triggering impulse is sufficient to directly set the flip-flop circuit 12, the extent to which the positive generated impulse voltage decreases thereafter is dependent upon the duration of the triggering impulse (compare C and E of Figure 3 and Figure 4). If the triggering impulse is of too short a duration or small in amplitude (G or I in Figure 3) the positive generated signal will be incapable of firing the thyratron valve 19, and inoperative to effect the generation of an output signal. However, a triggering signal may be amplified by the flip-flop valve 200 to sufficient amplitude to fire the thyratron valve 19 although it is insufficient to cut off the flip-flop valve 200, the said valve 200 being cut off upon the arrival of the trigger reinforcing signal.

From the above discussion it is obvious that the flip-flop circuit is used in a dual capacity, first as a generator of signals of substantially rectangular form and secondly as an amplifier of the triggering impulses used to fire a thyratron delay control circuit. The flip-flop valve 202 being normally nonconductive may be utilized as an amplifier when positive impulses are to be used for triggering instead of negative impulses designated for triggering in the above description. The advantages of such use are apparent. It should be noted, however, that the apparatus described in this disclosure is also operative when the thyratron valve 19 is fired by direct connection to a trigger input terminal supplied with positive triggering impulses.

In connection with Figure 5, there has already been some discussion of interference between the trailing edge of a negative-going impulse observed in the differentiating output, and an income triggering impulse. The system disclosed in Figures 9 and 10 includes provision for minimizing such interference, in addition to illustrating the use of a conventional flip-flop structure in connection with the pulse-forming apparatus.

Referring now to the block diagram of Figure 9, a flip-flop 301, having its left side normally conducting and its right side nonconducting, is linked to the trigger input terminal 300 by the line 302 extending to the normally conductive side of the flip-flop 301. The output from the normally conductive side of the flip-flop 301 is impressed on an output terminal 305 by way of the output line 304, while an output signal from the normally nonconductive side of the flip-flop 301 is impressed on the output terminal 306 via the line 307. The line 304 is further connected, through differentiator 308, with the control element of a thyratron 309 shunted by delay capacitor 310 in series with resistor 312. The resistor 311 completes a circuit for the charge of the delay capacitor 310. The junction between resistor 311 and capacitor 310 is connected with a cathode follower buffer stage 315 which, through the line 316, delivers a "set" signal to the normally conductive side of the flip-flop 301. Voltage impulses delivered across the resistor 312 during the discharge of the capacitor 310 are impressed on the normally nonconductive side of the flip-flop 301 through the lead 314 and serve to reinforce the effect of the trigger impulses applied to the terminal 300.

The general pattern of operation of the configuration of Figure 9 is essentially similar to that of the apparatus already described. The flip-flop 301 is normally in the "set" stage illustrated. Upon the arrival of a negative-going trigger input impulse of sufficient amplitude, the normally conductive side of the flip-flop is rendered non-conductive, transmitting a positive surge over the line 304 and through differentiator 308 to ionize the thyratron 309 and discharge the capacitor 310. The heavy discharge surge across resistor 312 develops a positive-going impulse applied to the line 314, which cooperates with the signals transferred by the internal coupling circuits of the flip-flop 301 to assist in rendering the right-hand side of said flip-flop conductive. Successive negative-going impulses applied to the trigger input terminal 300 are without effect, as they can only render the left-hand side of the flip-flop 301 nonconductive, which it already is. The capacitor 310 now gradually charges through resistor 311 delivering a signal of increasing positive magnitude through the cathode follower buffer stage 315 (see Figure 6) until a voltage level is reached initiating conduction in the left-hand side of the flip-flop 301 at which time the internal coupling circuits develop signals retransferring conduction, and returning the flip-flop to its "set" state. During the time the flip-flop 301 is in its triggered state, a negative-going output impulse may be derived from the terminal 306, and a corresponding positive-going impulse from the terminal 305. The duration of this impulse is determined mainly by the time constant of capacitor 310 and resistor 311, and is not substantially influenced by trigger input impulses arriving during its continuation.

The various circuits employed in the block diagram of Figure 9 are illustrated in greater detail in Figure 10, showing the flip-flop 301 as comprised of the valves 400 and 402. These valves are provided with the space charge electrodes 404, 406 connected with a supply bus of approximately minus 50 volts, and with cathodes 408, 410 similarly connected with a supply bus maintained at about minus 100 volts. The control electrode 412 of the valve 400 is coupled through the parallel resistance-capacitance combination 420 with the anode 418 of valve 402, and the control electrode 414 of the valve 402 is coupled by the parallel resistance-capacitance combination 422 with the anode 416 of the valve 400. The anodes 416 and 418 are further respectively connected with a supply bus maintained at approximately plus 15 volts through the load resistors 424, 426. Clamping diode combinations 428, 430 connected between the respective anodes and a supply bus maintained at approximately minus 60 volts serve to standardize the negative excursions of anode voltage occurring when the valves 400, 402 conduct and minimize changes in circuit operation with the aging of the flip-flop valves.

The control electrode 412 of the valve 400 is further connected through diodes 436 and capacitor 440 with the trigger input terminal 300. The diodes 436 are so poled as to present minimum impedance to negative-going signals impressed on the terminal 300. A resistor 438 connected to the junction of the diodes 436 and capacitor 440 provides a direct current return between the grid 412 and cathode 408. In addition, the grid 412 is connected with a negative supply bus, maintained at approximately 216 volts, through resistor 432, and, through the diodes 478 and resistor 476 with the cathode 470 of the cathode follower buffer valve 464.

The control grid 414 of the normally nonconductive valve 402 in the flip-flop 301 is also returned to a negative supply bus maintained at minus 216 volts and, through diodes 482 and capacitor 480 with the cathode 456 of the thyratron 309. The value of the resistances and potentials connected with and applied to the control and anode elements of the valves constituting the flip-flop 301 are proportioned in accordance with well-known rules to obtain the desired flipping action characteristic of the existence of two mutually exclusive discrete stable states.

The output terminal 305 is linked with the anode 416 of the valve 400, the output terminal 306 being similarly connected with the anode 418 of the valve 402. In addition, the anode 416 is connected over the line 304 with the differentiating capacitor 308 and thence, via the parallel resistance-capacitance combination 450, with the control electrode 452 of the thyratron 309. The thyratron 309 is provided with a cathode 456 returned through a resistor 312 to the negative supply bus maintained at approximately minus 216 volts, while the grid end of the capacitor 308 is returned through resistor 444 to a more negative supply bus maintained at approximately minus 229 volts and, through resistor 446 in series with diode 448, to the same supply bus. A shield grid 454 is directly connected with the cathode 456 and the anode 458 is connected through surge limiting resistor 460 and the charging resistor 311 with an anode supply bus maintained at a positive potential of about 90 volts. The junction of resistors 311 and 460 is connected with one terminal of the capacitor 310 whose other terminal is connected with the supply bus end of the resistor 312. A resistor 462 serves to couple the anode end of the capacitor 310 with the control grid 466 of the cathode follower coupling valve 464 whose anode is also connected with a positive supply bus. The cathode 470 of the cathode follower valve 464 is returned through resistor 472 to a supply bus maintained at approximately minus 140 volts, and through diodes 474 to a second negative supply bus maintained at about minus 88 volts. The diodes 474 are poled to limit the positive-going excursion of the cathode 470 to minus 88 volts. Where more than one diode is connected in series, such multiplication of units is usually in the interest of limiting the back voltage across the diode section to a safe permissible value, as it is well-known that conventional diodes may be subject only to limited back voltages without destruction of their unilateral conducting properties.

The circuit of Figure 10 is illustrated in the "set" state, which is to say that it is prepared to react to the receipt of a negative-going triggering impulse. Considering first the reaction of the circuit to a negative-going trigger impulse of magnitude sufficient to effect cutoff of the valve 400, it is apparent that the positive-going surge transmitted over the line 304 and through the differentiating capacitor 308, fires the thyratron valve 309. In the "set" state the capacitor 310 is charged to a potential making such firing of the thyratron 309 possible. The thyratron 309 now discharges the capacitor 310 through the resistors 460 and 312, whose combined value is such as to limit the surge current to safe peak cathode drain on the valve 309. If the resistance of 312 has a sufficiently high value, the resistance 460 may be eliminated. In any event, their combined value will not exceed a few hundred ohms. The voltage applied to the control grid 466 of the cathode follower valve 464, now swings negative cutting off the flow of current through this valve, and effectively disconnecting the cathode 470 therefrom at the diode 478. At the same time, the discharge current flowing through the resistor 312 gives rise to a positive-going surge impressed, by capacitor 480 and diodes 482, on the control grid 414 of the valve 402, rendering the same conductive. It will be noted that this surge supplements the normal transfer voltages developed through the coupling network 422, 434.

The significance of this will be later apparent. Should another negative impulse be impressed on the terminal 300 while the circuit continues in this state, no reaction thereto will be observed, since the valve 400 is already cut off, and no change in current flow therethrough can be produced by negative-going impulse on the control grid 412. Positive-going impulses are prevented from arriving at the control grid 412 by reason of the poling of the diodes 436.

After discharge, the capacitor 310 charges from the anode source through the resistor 311, the time constant of this circuit being such as to provide the desired duration of output impulse. Where a very long output impulse is desired, the resistance 311 may be measured in megohms. As the charging process continues, a voltage level is reached where conduction through the valve 464 delivers sufficient current to the resistor 472 to elevate the potential of the cathode 470 to a point where conduction through the diode 478 and resistor 476 initiates the flow of current through the flip-flop valve 400 to establish conditions resulting in retransfer of conduction from the valve 402 to the valve 400, returning the flip-flop 301 to its "set" state.

This is accompanied by the appearance of a negative-going surge on the line 304 which is transmitted through the capacitor 308. However, the diode 448 is poled to present minimum impedance to negatively poled surges and the negative-going surge shown in Figure 5 is immediately absorbed therein whereby the trailing edge of the negative-going differentiated impulse is prevented from interfering with a subsequently appearing positive-going impulse. The resistor 446 is provided in series with the diode 448 to limit the peak current in the circuit, and may be eliminated if such limitation is neither required nor desired. Immediately, therefore, after the resetting of the flip-flop 301, the application of a negative-going impulse to the terminal 300 will effect a repetition of the previously described phenomena.

For stability, flip-flop designs require that the voltage applied to the control electrode 414 of the normally nonconductive flip-flop valve 402 be somewhat greater than cut-off, whereby a small negative-going impulse applied to the terminal 300 may not produce a sufficient voltage change at the control electrode 414 to effect conduction transfer. In this event, the valve 400 may be regarded simply as an amplifier and, if the positive-going impulse developed in its anode circuit is sufficient to fire the thyratron 309 through the coupling circuit including capacitor 308, the conduction transfer will nevertheless be effected, because of the trigger reinforcing impulse developed across the resistor 312 in the cathode circuit of the thyratron 309, and impressed on the control grid 414 through the capacitor 480 and the diode 482. It is to be noted that the return provided by the resistor 484 connected between the diode end of the capacitor 480 and a supply bus maintained at approximately minus 117 volts biases the diode 482 so that only the relatively large impulses attendant upon discharge of capacitor 310 are effective to perform the trigger reinforcing function.

As before, the circuit illustrated in Figure 10 makes use of the extremely high ratio of conductivity when in the ionized state to conductivity when in a non-ionized state of the thyratron valve 309 to extend the monitored duration of the standardized output impulses developed in response to incoming trigger voltages. In applications where this advantage is not essential, a "hard" valve may be used in an appropriately altered circuit.

It will be obvious to those skilled in the art that the invention may find wide application with appropriate modification to the individual design circumstances, but without substantial departure from the essence of the invention.

What is claimed is:

1. In combination, a signal input line, a signal output line, an apparatus having two stable states operatively connected to said signal input and output lines, a delay network comprising a gas valve and a resistor-capacitor combination operatively connected to said apparatus, a first signal transfer link operating to pass signals within a predetermined range operatively connected between said delay network and said apparatus, and a second signal transfer link operating to pass signals within a different predetermined range operatively connected between said delay network and said apparatus.

2. In combination, a signal input line, a plurality of signal output lines, a toggle flip-flop circuit operatively connected to said signal input and output lines, a delay network comprising a gas valve and a resistor-capacitor combination operatively connected to said toggle flip-flop circuit, and a signal transfer link comprising a cathode follower circuit operatively connected between said delay network and said toggle flip-flop circuit.

3. In combination, a signal input line, a plurality of signal output lines, a flip-flop circuit operatively connected to said signal input and output lines, a delay network comprising a gas valve and a resistor-capacitor combination operatively connected to said flip-flop circuit, and a signal transfer link comprising a cathode follower circuit operatively connected between said delay network and said flip-flop circuit.

4. In combination, a signal input line, first and second signal output lines, a toggle flip-flop circuit comprising a first electrode structure including a control electrode operatively connected to said signal input line and an output electrode and a second electrode structure including a control electrode and an output electrode respectively crossconnected to the output electrode and control electrode of said first electrode structure, said output electrodes also being respectively connected to said first and second signal output lines, a delay network comprising a gas valve including a control electrode operatively connected to the output electrode of the second electrode structure in said toggle flip-flop circuit and an output electrode operatively connected to a resistor-capacitor combination, a cathode follower unit comprising an electrode structure including a control electrode operatively connected to the output electrode of said delay network and a cathode, and a signal transfer link comprising a first diode and second diode having the anode of said first and the cathode of said second respectively connected to the cathode of the said cathode follower unit and having the cathode of said first diode and the anode of said second diode respectively coupled to the control electrode of the second electrode structure in said toggle flip-flop circuit.

5. In combination, a signal input line, first and second signal output lines, a toggle flip-flop circuit comprising a first electrode structure including a control electrode operatively connected to said signal input line and an output electrode and a second electrode structure including a control electrode and an output electrode respectively cross-connected to the output electrode and control electrode of said first electrode structure, said output electrodes also being respectively connected to said first and second signal output lines, a delay network comprising a restoring signal differentiator and a thyratron valve including a control electrode operatively connected to the output electrode of the first electrode structure in said toggle flip-flop circuit and an output electrode operatively connected to a resistor-capacitor combination, a cathode follower unit comprising an electrode structure including a control electrode operatively connected to the output electrode of said delay network and a cathode, and a signal transfer link comprising a first diode and second diode having the anode of said first and the cathode of said second operatively connected to the cathode of said cathode follower unit and having the cathode of said first diode and the anode of said second diode resistance coupled to the control electrode of the first electrode structure in said toggle flip-flop circuit.

6. In combination, a signal input line, first and second signal output lines, a flip-flop circuit comprising a first electrode structure including a control electrode operatively connected to said signal input line and an output electrode and a second electrode structure including a control electrode and an output electrode respectively crossconnected to the output electrode and control electrode of said first electrode structure, said output electrodes also being respectively connected to said first and second signal output lines, a delay network comprising a gas valve including a control electrode operatively connected to the output electrode of the second electrode structure in said flip-flop circuit and an output electrode operatively connected to a resistor-capacitor combination, a signal transfer link comprising a cathode follower unit including a control electrode operatively connected to the output electrode of said delay network and a cathode operatively coupled to the control electrode of the second electrode structure in said flip-flop circuit.

7. In combination, a signal input line, first and second signal output lines, a flip-flop circuit comprising a first electrode structure including a control electrode operatively connected to said signal input line and an output electrode and a second electrode structure including a control electrode and an output electrode respectively crossconnected to the output electrode and control electrode of said first electrode structure, said output electrodes also being respectively connected to said first and second signal output lines, a delay network comprising a gas valve including an output electrode operatively connected to a resistor-capacitor combination a control electrode operatively connected to the output electrode of the first electrode structure and a cathode operatively connected to the control electrode of the second electrode structure in said flip-flop circuit, a signal transfer link comprising a cathode follower unit including a control electrode operatively connected to the output electrode of said delay network and a cathode operatively coupled to the control electrode of the first electrode structure in said flip-flop circuit.

8. In combination, a signal input line, first and second signal output lines, a flip-flop circuit comprising a first electrode structure including a control electrode operatively connected to said signal input line and an output electrode and a second electrode structure including a control electrode and an output electrode respectively crossconnected to the output electrode and control electrode of said first electrode structure, said output electrodes also being respectively connected to said first and second signal output lines, a delay network comprising a restoring signal differentiator and a thyratron valve including an output electrode operatively connected to a resistor-capacitor combination a control electrode operatively connected to the output electrode of the first electrode structure and a cathode operatively connected to the control electrode of the second electrode structure in said flip-flop circuit, a signal transfer link comprising a cathode follower unit including a control electrode operatively connected to the output electrode of said delay network and a cathode operatively coupled to the control electrode of the first electrode structure in said flip-flop circuit.

9. In combination, a signal input line, first and second signal output lines, a delay network comprising a gas valve including a control electrode operatively connected to said signal input line and an output electrode operatively connected to a resistor-capacitor combination, a cathode follower unit comprising an electrode structure including a control electrode operatively connected to the output electrode of said delay network and a cathode, a toggle flip-flop circuit comprising a first electrode structure including a control electrode and an output electrode and a second electrode structure including a control electrode and an output electrode respectively crossconnected to the output electrode and control electrode of said first electrode structure, said output electrodes also being respectively connected to said first and second signal output lines, and a signal transfer link comprising a first diode and second diode having the anode of said first and the cathode of said second operatively connected to the cathode of said cathode follower unit and having the cathode of the first diode and the anode of said second diode respectively coupled to the control electrode of the first electrode structure in said toggle flip-flop circuit.

10. In combination, a signal input line, first and second signal output lines, a delay network comprising a gas valve including a control electrode operatively connected to said signal input line and an output electrode operatively connected to a resistance-capacitance combination, a signal transfer link comprising a cathode follower unit including a control electrode operatively connected to the output electrode of said delay network and a cathode, and a flip-flop circuit comprising a first electrode structure including a control electrode operatively connected to the cathode of said signal transfer link and an output electrode and a second electrode structure including a control electrode and an output electrode respectively crossconnected to the output electrode and control electrode of said first electrode structure, said output electrodes also being respectively connected to said first and second signal output lines.

11. In combination, an electric network characterized by a plurality of mutually exclusive stable electrical states, an input line connecting with a portion of said network initiating one of said states when said input line is excited, an electric storage device, a discharge device connected with said storage device actuated by signals derived from said electric network, a charging circuit connected with said storage device, and electric connections between said storage device and said electric network initiating one of said states when said storage device is charged and another of said states when said storage device is discharged.

12. In combination, a signal input line, a signal output line, a multistable apparatus operatively connected to said signal input and output lines, an electric valve having a control member and output electrodes, a resistor-capacitor combination connected with said electric valve and forming a delay network in combination therewith, a connection between said multistable apparatus and said control member, a first signal transfer link operating to pass signals within a predetermined range operatively connected between one of said output electrodes and said multistable apparatus and a second signal transfer link operating to pass signals within a different predetermined range operatively connected between one of said output electrodes and said multistable apparatus.

13. In combination, a signal input line, a signal output line, an apparatus having one stable state operatively connected to said signal input and output lines, an electric valve having a control member and output electrodes, a resistor-capacitor combination connected with said electric valve and forming a delay network in combination therewith, a connection between said apparatus and said control member, a first signal transfer link operating to pass signals within a predetermined range operatively connected between one of said output electrodes and said apparatus and a second signal transfer link operating to pass signals within a different predetermined range operatively connected between one of said output electrodes and said apparatus.

14. In combination, a signal input line, a signal output line, a flip-flop circuit operatively connected to said signal input and output line, an electric valve having a control member and output electrodes, a resistor-capacitor combination connected with said electric valve and forming a delay network in combination therewith, a connection between said flip-flop and said control member, a first signal transfer link operating to pass signals within a predetermined range operatively connected between one of said output electrodes and said flip-flop and a second signal transfer link operating to pass signals within a different predetermined range operatively connected between one of said output electrodes and said flip-flop.

15. In combination, an electric storage device, an electric valve connected in charge conveying relationship with said storage device, a signal line delivering control impulses to said electric valve, a first unilateral conductor operating at a first bias operatively connecting said storage device with a signaling network, and a second unilateral conductor operating at a second bias operatively connecting said storage device with said signaling network.

References Cited in the file of this patent

UNITED STATES PATENTS

| | | |
|---|---|---|
| 2,265,290 | Knick | Dec. 9, 1941 |
| 2,428,926 | Bliss | Oct. 14, 1947 |
| 2,445,448 | Miller | July 20, 1948 |
| 2,452,549 | Cleeton | Nov. 2, 1948 |
| 2,496,543 | Kanner | Feb. 7, 1950 |